United States Patent [19]

DiFrank

[11] Patent Number: 4,793,465
[45] Date of Patent: Dec. 27, 1988

[54] BOTTLE CONVEYING SYSTEM

[75] Inventor: Frank J. DiFrank, Toledo, Ohio

[73] Assignee: Owens-Illinois Glass Container Inc., Toledo, Ohio

[21] Appl. No.: 79,561

[22] Filed: Jul. 30, 1987

[51] Int. Cl.[4] .............................................. B65G 47/26
[52] U.S. Cl. .................................... 198/432; 198/792; 198/805
[58] Field of Search ............... 198/429, 430, 433, 447, 198/448, 792, 805, 831, 833, 851–853, 861.1, 457, 432; 65/68, 69, 117, 118, 348

[56] References Cited

U.S. PATENT DOCUMENTS

| | | | |
|---|---|---|---|
| 2,446,890 | 8/1948 | Stadelman | 198/831 |
| 2,948,093 | 8/1960 | Bonami | 198/429 |
| 3,027,990 | 4/1962 | Blank et al. | 198/429 |
| 3,365,857 | 1/1968 | Liedtke | 198/792 |
| 3,416,645 | 12/1968 | Jones | 198/833 |
| 3,672,484 | 6/1972 | Angioletti et al. | 198/334 |
| 3,682,295 | 8/1972 | Roinestad | 198/831 |
| 3,944,044 | 3/1976 | Hamy | 198/833 |
| 4,082,173 | 4/1978 | Simon-Kochloffel | 198/833 |

FOREIGN PATENT DOCUMENTS

| | | | |
|---|---|---|---|
| 2737458 | 3/1979 | Fed. Rep. of Germany | 198/433 |
| 87471 | 8/1978 | Japan | 198/792 |

Primary Examiner—Joseph E. Valenza

[57] ABSTRACT

Apparatus is described for conveying newly formed, hot bottles from the forming machine to an annealing lehr which is conventionally positioned with its lehr mat or belt running in a direction parallel to the movement of the transfer conveyor. The transfer conveyor surface is driven at a first speed as it passes in front of the multiple section glass forming machine. After passing the machine sections, the conveyor, made of a plurality of horizontal links, has the individual, successive links moved closer together to, in effect, shorten the length of the link belt conveyor. This shortening is the result of the drive for the link belt conveyor being discontinued just after the belt is engaged from beneath by a magnetic link belt chain driven at a slower speed. The chain is guided in a first straight line parallel to the machine conveyor direction and then guided through a 90° arc to pass in front of the lehr so the bottles can be transferred from the conveyor surface to the lehr mat with a lehr loader. The system described above may be doubled so that two conveyors are provided to carry the bottles to the lehr and thus the speed of the conveyors does not need to be as fast and the bottles are more stable during transfer.

8 Claims, 15 Drawing Sheets

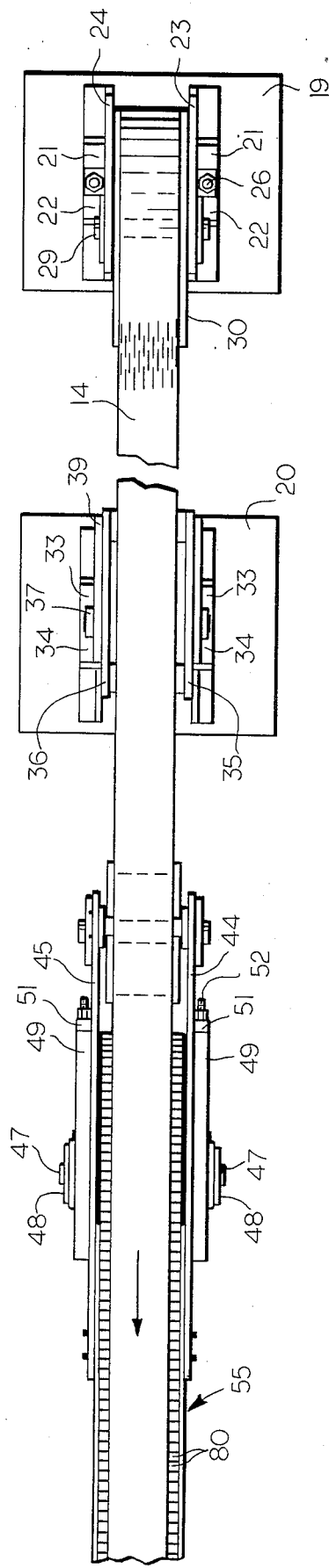
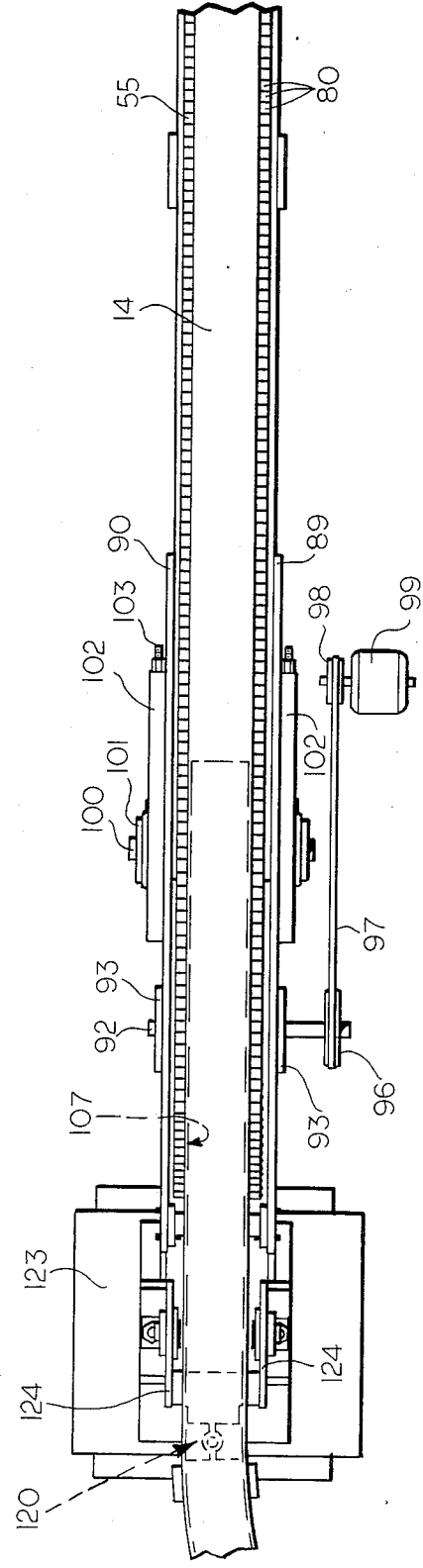
FIG. 3
FIG. 12

BOTTLE CONVEYING SYSTEM

This invention relates to a system for conveying hot, newly formed, glass containers from the forming machine to a position in front of an annealing lehr.

BACKGROUND OF THE INVENTION

It has been the practice in the past to place newly formed glass containers on a moving conveyor that passes by the deadplates of a multi-section I.S. type glass forming machine. The containers are moved from the deadplate onto the conveyor and then move away from the machine in a straight line. The newly formed bottles are annealed to remove thermal stresses by placing them on the mat of a lehr. The lehr is a fairly wide oven that will accept rows of bottles, in sequence, as the lehr mat or conveyor moves through the lehr. The lehr is usually positioned with its opening at right angles to the machine conveyor; thus the bottles on the machine conveyor are moved through a transfer curve onto another conveyor which moves across the width of the opening into the lehr when a line of bottles is periodically pushed onto the traveling lehr mat.

Such a handling system is schematically shown and described in U.S. Pat. No. 4,193,784, issued Mar. 18, 1980. As shown in this patent, the row of bottles on the machine conveyor 14 is moved to a cross conveyor 15 by a transfer device 16. It should be noted that reference is made in this patent to other patents which disclose examples of these mechanisms in greater detail. This background information is incorporated herein by reference thereto in order to provide a complete understanding of the present invention. The transfer device which is presently in use is abusive to the hot bottles and also can only perform its function to a certain speed without upsetting the containers, particularly if those containers are tall and narrow in shape.

In an effort to overcome the transfer problem, the use of sideflex chains, such as Rexnord Multi-flex or Link Belt FJG, have been suggested and in those instances where they were used they were found to be of short life and required a great deal of lubrication. This excessive lubrication created the problem that when the hot bottles encountered the volatile lubrication, the results would be a thermal check in the bottle at the place where the lubrication would evaporate due to the hot bottle contact. It was the practice to lubricate the conveyor belts or chains and then burn off the excess lubrication in advance of the ware contacting the chain. This burning of the lubrication usually by directing a flame onto the surface would draw out the chain temper resulting in reduced life.

SUMMARY OF THE INVENTION

Apparatus for moving hot, newly formed, glass containers from the forming machine to a lehr by using a flex-top conveyor moving past the forming machine to receive the containers thereon in single file and carry the containers through a curved path into position across the front of the lehr. The machine conveyor being one which is driven by a lubricated power conveyor which engages the machine conveyor from beneath keeping lubricant off the machine conveyor upper surface and driving the machine conveyor around a corner. A second power conveyor, separate from the first, engages the portion of the machine conveyor chain that is moving across the front of the lehr. The first power conveyor is driven at a first speed and the second conveyor is driven at a slightly slower speed. The pins of the machine conveyor chain are moved closer together a preselected amount as the conveyor chain passes from the first power conveyor to the second power conveyor resulting in the desired spacing of bottles on the conveyor chain in front of the lehr.

In a second embodiment, there are two machine conveyor chains which serve the forming machine that permits handling the production from a 10 section, quadruple cavity forming machine with maximum speed without tipping of the ware during travel to the lehr.

With the foregoing in view, it is an object of the present invention to provide a hot bottle handling system which will receive the hot bottles on a moving chain conveyor and carry the ware from the machine, around a 90° corner, into position in front of a lehr at a different, selected bottle spacing without engaging the ware with a corner transfer and bottle spacing mechanism.

It is a further object of this invention to handle the production from a high productivity glass forming machine, such as a 10 section, quadruple cavity I.S. machine, in such a manner that the bottles will arrive at the proper spacing in front of the lehr in a minimum time without danger of bottles being thermally stressed from lubricant evaporation on the chain conveyor or engaging of the bottles with a side engaging transfer device.

Other and further objects will be apparent from the following description taken in conjunction with the annexed sheets of drawings.

BRIEF DESCRIPTION OF THE DRAWINGS

FIG. 3 is a top plan view of FIG. 2;

FIG. 12 is a top plan view of FIG. 7;

DETAILED DESCRIPTION OF THE DRAWINGS

Figure 1:
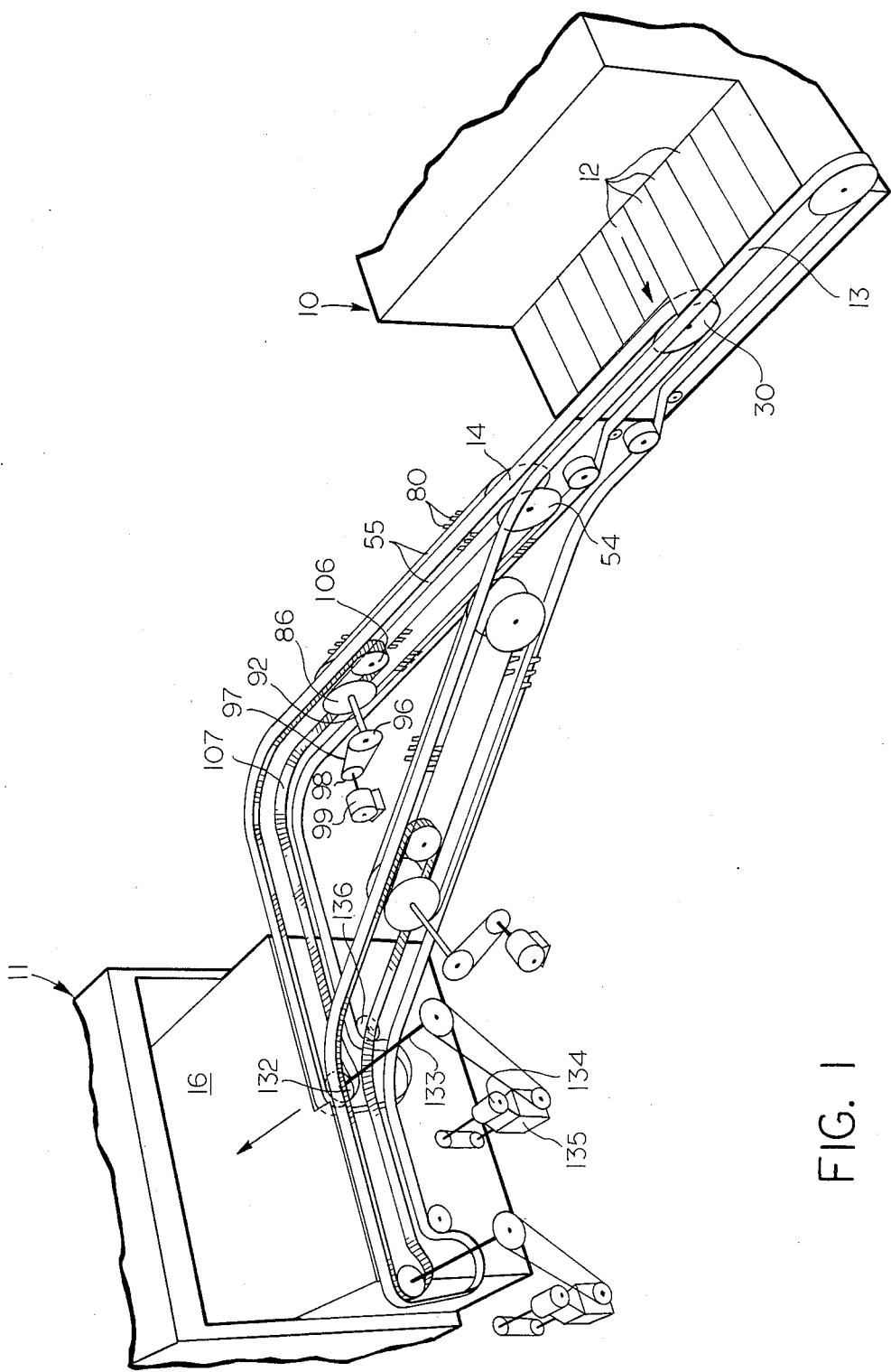
FIG. 1 is a schematic perspective view of the bottle handling system of the invention.
Figure 1A:
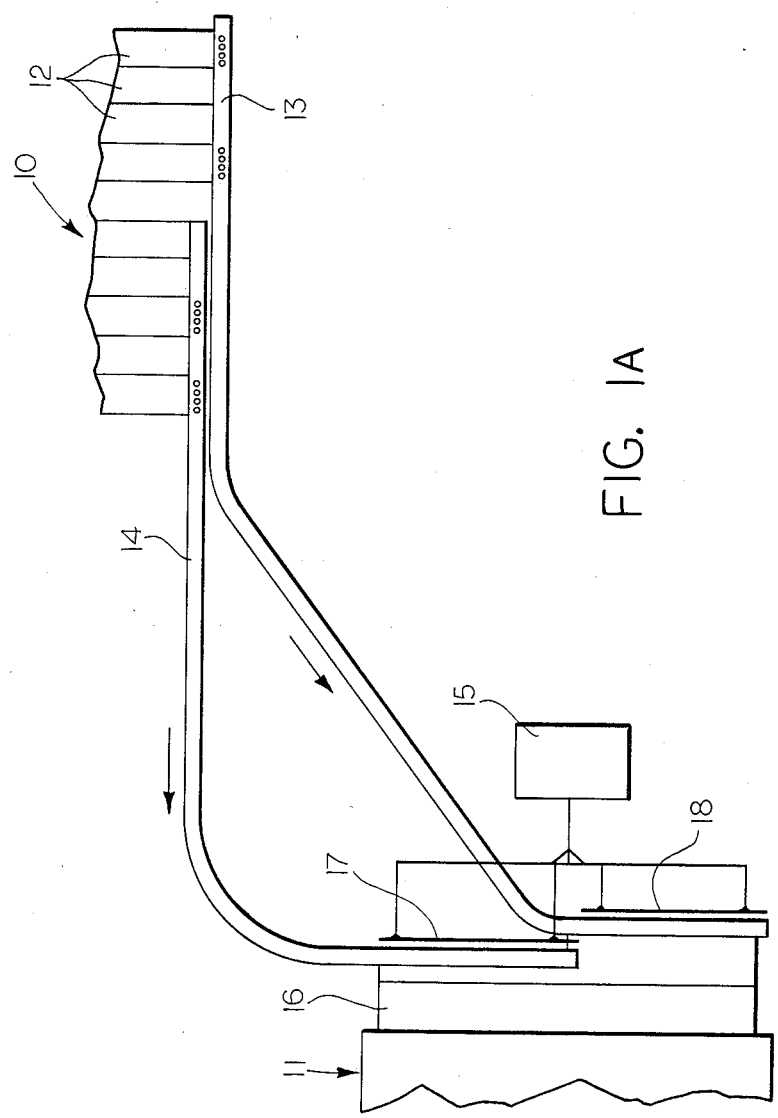
FIG. 1A is a schematic plan view of the conveying system of FIG. 1.

With particular reference to FIG. 1, which is a top plan view schematically showing the relationship of a glass forming machine 10 and lehr 11, the forming machine 10 is shown as being composed of ten individual sections 12. As shown schematically in FIG. 1, running in front of the forming machine 10 is a first machine conveyor 13 which extends from the first five sections to a position in front of the lehr 11, in particular the left hand side of the lehr. Actually the machine conveyor 13 extends the full length of the forming machine 10 and the full width of the lehr 11. A second machine conveyor 14 is shown as extending from in front of the last five individual sections 12 of the machine 10 and extends to the area in front of the lehr 11, but only extends approximately halfway the length of the lehr.

Newly formed bottles which are produced in the forming machine are moved in line on the machine conveyors from the individual sections by the usual takeout and sweepout mechanisms associated with these types of glass forming machines. The bottles will be sitting upright on the surface of the machine conveyors and will be transported by movement of the machine conveyors in the direction of the arrows shown to the position in front of the lehr 11.

Both of the conveyors 13 and 14 are endless linkbelt conveyors formed of a plurality of metallic links as will be described later in connection with FIGS. 4 and 5.

It should be noted that the two conveyors 13 and 14 extend in front of the forming machine and pass through a curve in the horizontal plane to extend in front of the lehr as well. Both of the conveyors have return sections which will pass back to the starting point following essentially the same path, but at a lower level than the top of the conveyors illustrated in FIG. 1.

When the ware is positioned in front of the lehr in complete rows, the ware is transferred from the machine conveyor onto a moving lehr belt 15, which is a continuously moving chain link belt moving in the direction of the arrow thereon to carry the ware through the annealing lehr 11. The movement of the bottles from the machine conveyor into the lehrs is by the usual operation of a lehr loader 15, which will move a pair of horizontal pusher bars 16 and 17 across the upper surface of the machine conveyors to transfer the ware on the conveyors at the position in front of the lehr onto the lehr belt.

It should be understood that the pusher bars 16 and 17, after moving through the line of ware on their respective portions of the machine conveyors that they are facing, will be elevated and returned back to the initial positions by the usual operation of the lehr loader 15.

In general, the system for driving the machine conveyor 14 in the operation of the ware transfer system of the invention is schematically illustrated in FIG. 1. The bottles that are produced in the sections 12 of the glass forming machine 10 will be transferred in the normal sweepout mechanism to the conveyors 13 and 14. It should be understood that the five sections illustrated to the right in FIG. 1 will be delivering its formed ware to the conveyor 13 while the second five sections to the left as viewed in FIG. 1 will be delivering their ware to the conveyor 14. It should be noted that the conveyor 14 will run on a fairly straight line and then go through a curve of approximately 90° and then extend across in front of the lehr 11 approximately half the width of the lehr. In the same manner, the conveyor 13 extends parallel to the conveyor 14 until it curves to the left, as viewed in FIG. 1, and approaches the lehr 11 adjacent the trailing end of the conveyor 14 and then extends across the front of the second half of the lehr 11. The reason the path of conveyor 13 is curved away from conveyor 14 is t provide the space necessary for standard surface treatment equipment to be installed in the path of both conveyors. The ware is transferred from the conveyors 13 and 14 onto the lehr mat 16, as previously explained, by a pusher mechanism 15. It should be understood that the ware from the conveyor 14 will be pushed out of line with the ware from the conveyor 13 because of the relative positioning across the face of the lehr 11. However, when the lehr receives the ware, the mat will be moving at a constant velocity so that the ware will be transferred and moved through the lehr in rows based upon the difference in positioning of the ware at the time it is pushed on the lehr. In other words, the half of the lehr that is to be filled by the ware from the conveyor 14 may not match with the ware that is conveyed on the conveyor 13; however, it is timed such that the ware from the conveyor 14 will align with the ware from the conveyor 13 in the lehr, although being perhaps one row in back of the other in the normal horizontal alignment of the ware. It is generally convenient to have the ware in the lehr in alignment to assure proper handling at the exit end of the lehr where the ware is to be taken from the lehr and moved to an area where it may be packed in cases for shipment.

While the present invention is being described principally as a device for handling bottles from the forming machines to the annealing lehr, the principal of the invention could be equally applicable to the transfer of a plurality of articles from one area to the second area and during the transfer of the articles change and close up the spacing between the articles during the transfer without the intervention of any mechanisms actually touching the ware physically, as was the case in the past.

Figure 2:
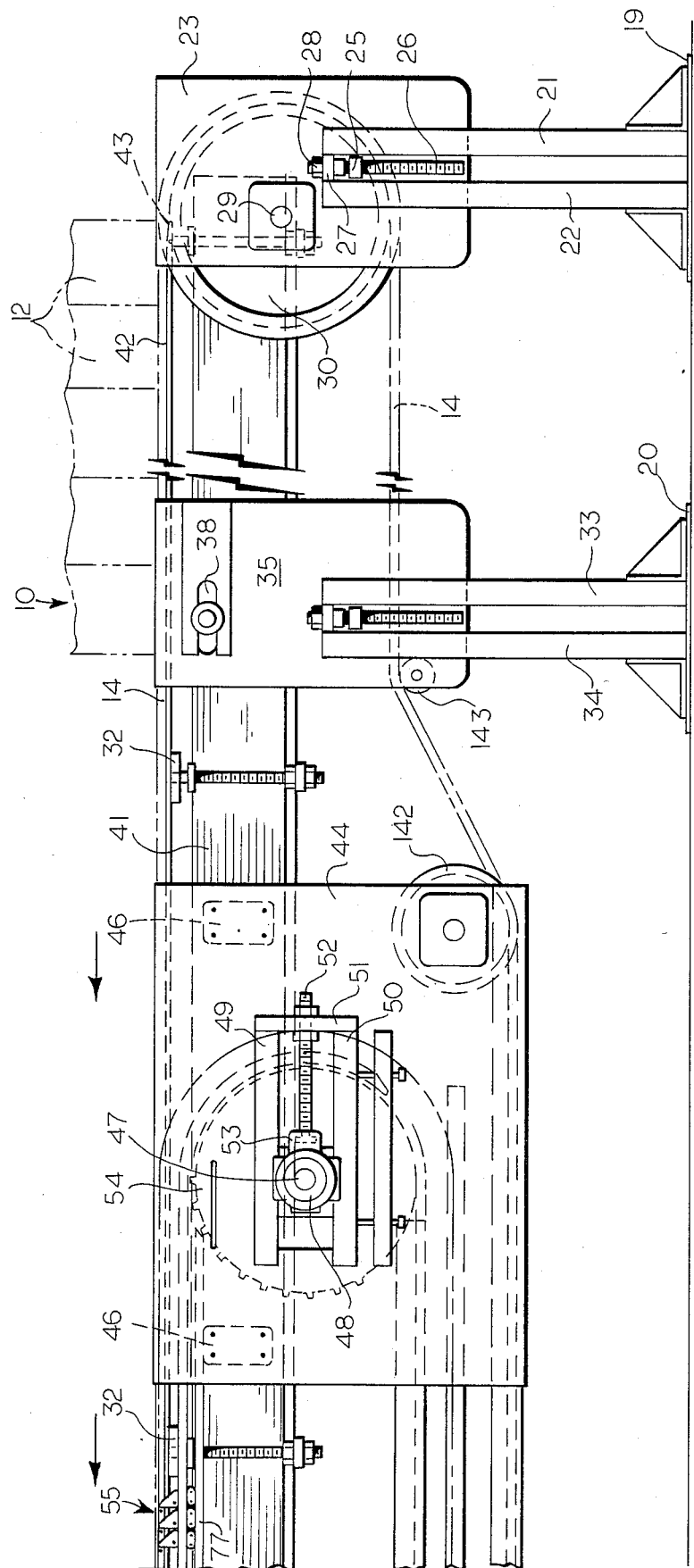
FIG. 2 is a side elevational view of a portion of the conveyor in front of the forming machine.

With particular reference to FIGS. 2 and 3, the manner of supporting the conveyor 14 as it passes in front of the forming machine will be explained in detail.

A pair of supporting or base plates 19 and 20 support pairs of vertical legs 21 and 22. At the extreme right end of FIG. 2, above the base plate 19, the vertical legs 21 and 22, of which there are sets on both sides of the conveyor as illustrated in FIG. 3, will support a pair of vertical plates 23 add 24. The plate 23, as best seen in FIG. 2 in the area between the two vertical legs 21 and 22, is provided with an outwardly extending boss 25 which is threaded to receive an adjusting bolt 26. The bolt 26 threads through the boss 25, which is welded to the face of the plate 23, and extends thereabove through a horizontal plate 27. The threaded bolt or screw 26 has a lock nut 28 threaded thereon. The rotation of the bolt or screw 26 will effectively adjust the relative position of the plate 23 with respect to the floor or base plate 19 upon which the conveying system is positioned. Loosening of the nut 28 and rotation of the screw 26 in the threaded boss 25 may affect this vertical adjustability.

As can best be seen in FIGS. 2 and 3, a horizontal shaft 29 extends between the plates 23 and 24. The shaft 29 supports a spool 30. The spools 30 in effect form a return path for the link chain conveyors 13 and 14.

As can best be seen in FIGS. 2 and 3, the base plate 20 has pairs of legs 33 and 34 which support a pair of vertical plates 35 and 36. Each plate 35 and 36 supports one end of a horizontal pin 37 which extends through a horizontal slot 38 provided in each of plates 35 and 36. The slots 38 actually are also formed in a welded support plate 39. The plates 35 and 36 also support an intermediate hollow beam 41, it being understood that the horizontal pin 37 extends not only through the vertical plates 36 and 3,, but also through an opening through the hollow beam such that the pin actually supports some of the weight of that portion of the beam through which it passes. The plates 35 and 36 are also fastened to the hollow beam 41 by intervening bolts and plates (not shown). The previously described H-shaped support blocks 32 support a horizontal plate 42 which serves to support the machine conveyor belt 14 from the point 43 adjacent the top of the spool 30. As the belt or chain 14 passes around the spool 30 and is guided thereby, it will be brought up and over the plate 42 to follow therealong in a horizontal direction toward the left, as viewed in FIGS. 2 and 3. The upper edges of the plates 23 and 24 and plates 35 and 36 will tend to maintain the chain in its horizontal path of travel overlying the plate 42 as the chain moves in the direction of the arrows shown in FIG. 2 toward the left. The main horizontal hollow beam 41, as shown in FIGS. 2 and 3, supports a pair of vertical side plates 44 and 45. The plates 44 and 45 are supported by the beam 41 through the advent of plates 46 welded thereto with bolts extending through the plates 44 and 45 into the plates which in turn are welded to the hollow beam 41. The plates 46 are schematically illustrated in FIG. 2. The plates 44 and 45 also support a horizontally extending shaft 47 which extends therebetween. The ends of the shaft 47 are carried in bearing blocks 48. Both bearing blocks 48 in turn are supported in horizontal guideways 49 and 50 which are mounted to the outside faces of the plates 44 and 45. A cross bar 51 extends between the right hand ends of the guideways 49 and 50. The cross bar 51 serves as a support for the threaded end of an adjusting screw 52. The screw 52 has its other end rotatably fixed in a socket 53 which is attached to the bearing block 48. It should be understood that there is an adjusting screw adjacent either end of the shaft 47 so that both ends of the shaft 47 may be adjusted horizontally for the purpose of taking up the slack in a drive chain to be described. The shaft 47 supports, at either side thereof between the plates 44 and 45 and the hollow beam 41, a pair of sprocketed wheels 54. The sprocket wheels 54 are idler sprockets which support a pair of spaced apart drive pusher chains generally designated 55 and shown in greater detail in FIG. 6.

Figure 4:
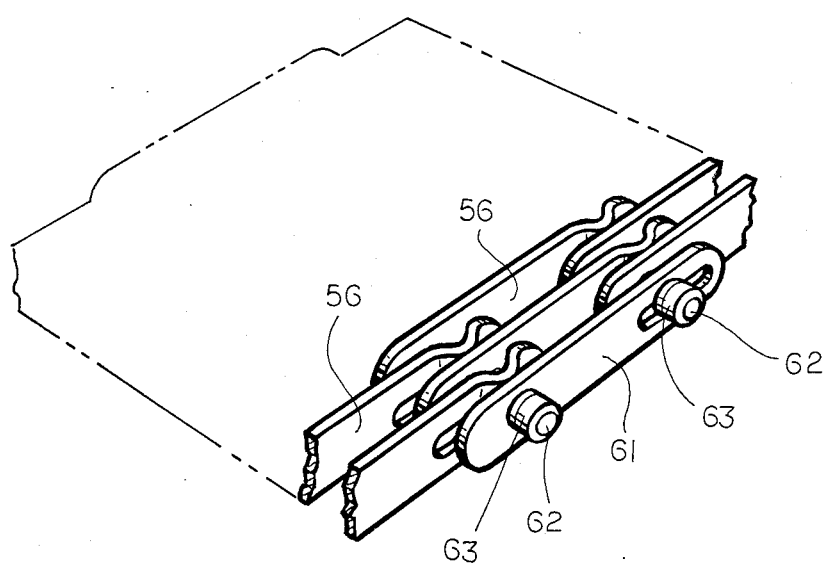
FIG. 4 is an enlarged perspective view of a portion of the conveyor used in the present invention.
Figure 5:
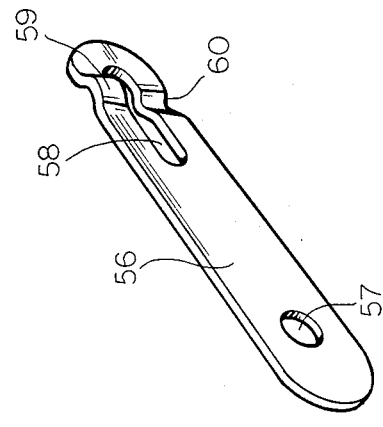
FIG. 5 is a perspective view of one link in the conveyor of FIG. 4.

With reference to FIGS. 4 and 5, the detail of the supporting conveyors 13 and 14 will be described. Both the conveyors 13 and 14 are essentially identical and consist of a plurality of generally flat plate-like members 56 positioned with their long dimension horizontal and width dimension vertical. A circular hole 57 is provided in one end of the member 56 and a horizontally extending slot 58 is formed adjacent the opposite end of the element 56. It should also be noted that the webs of the element that ar above and below the slot 58 are outwardly bowed as in 59 and 60 with the direction of the outward bowing being opposite as shown clearly in FIG. 5. An assemblage of these elements 56 is shown in FIG. 4 wherein all of the elements 56 are identical with the exception of an outside element 61, which is formed with a hole at one end and an elongated slot at the other end. However, this element 61 is not bent or bowed but in all other respects the element 61 is essentially the same as element 56. In particular, element 61, although flat throughout its entire length, has a hole comparable to the hole 57 and slot 58 of the element 56. The elements are joined together by horizontally extending pins 62. The pins 62, at the ends which extend beyond the sides of the element 61, are provided with enlarged roller-like members 63. While the conveyor 14 described in detail with respect to FIGS. 4 and 5 is generally a purchased item from FMC corporation, its configuration was changed to the extent that the hole 57 was moved toward the slot 58 in order to have a longer area between the hole 57 and the end of the element 56. In this fashion, it was found that when the conveyor 14 is flexed so that it will turn a corner, the end adjacent the hole 57 will be sufficiently long so as not to become hung up on the raised or bowed areas 59 or 60 of the adjacent opposite end and prevent or restrict the relative lateral movement of the elements 56 with respect to each other. In the original FMC elements 56, the hole 57 would be 0.23 inches from the end while with the overall length of the element 56 being 2.23 inches. In the modification, the hole is to be moved so that it is at least 0.35 inches from the end of the element.

Figure 6:
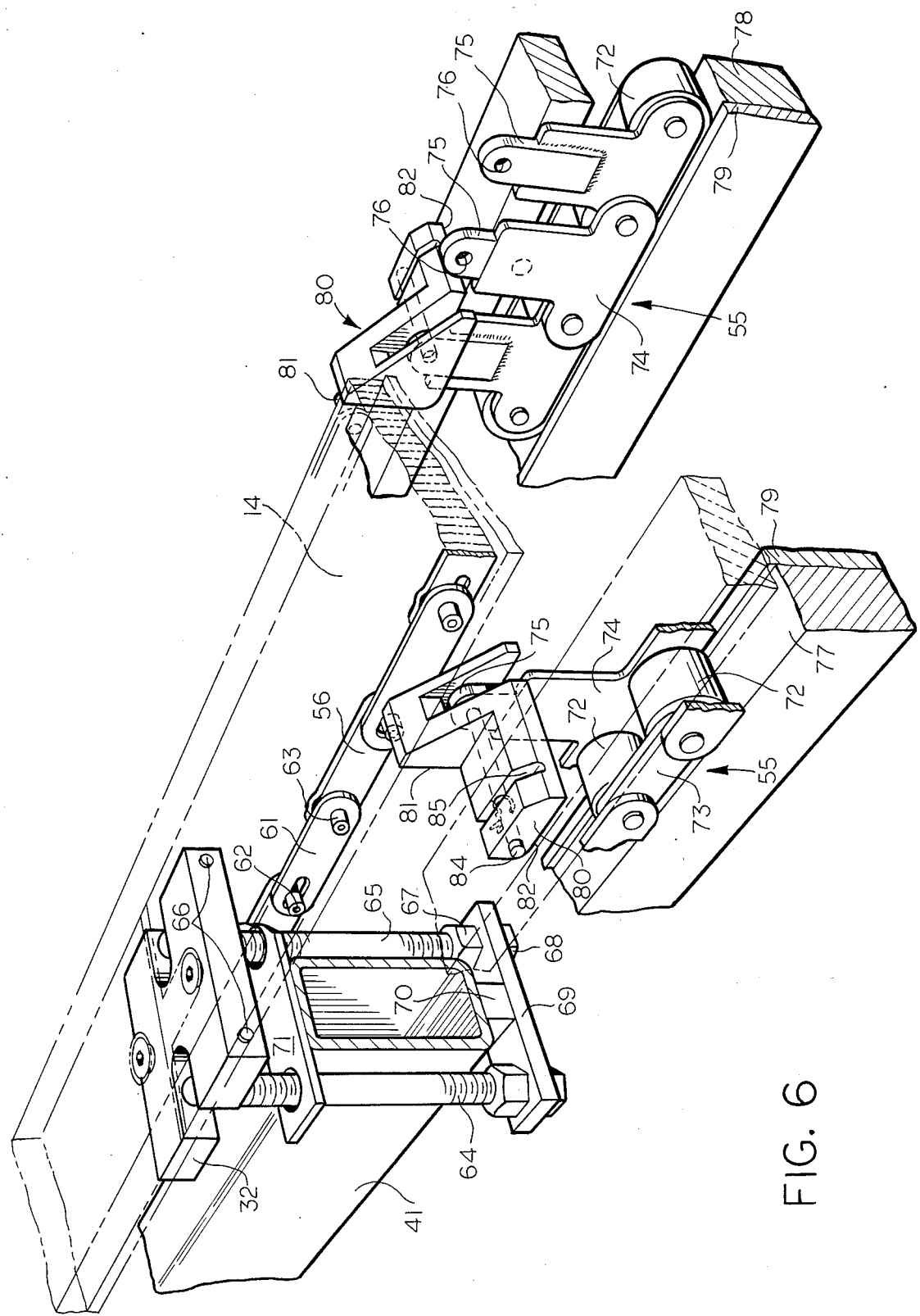
FIG. 6 is an enlarged perspective view with portions broken away illustrating the conveyor drive of the invention.

The drive chain 55 is best illustrated in FIG. 6, which is a fragmentary perspective exploded with parts eliminated to illustrate basically the two drive chains which constitute the mechanism for driving the conveyor 14. As previously explained, H-shaped support blocks 32 are carried at the upper end of a pair of threaded bolts 64 and 65. The upper ends of the bolts 64 and 65 are provided with horizontal, drilled passages therethrough through which a pair of pins 66 extend with the pins also extending through suitable openings formed in the legs of the H-shaped members 32. In this way the upper ends of the bolts 64 and 65 support the plate 32 in its elevated position. The lower end of the bolts 64 and 65 carry a pair of nuts 67 and 68 with the nut 67 threaded on the bolts 64 and 65 above a horizontal cross plate 69, which is welded at its center to a horizontal elongated bar 70, which in turn is welded to the bottom of the hollow horizontal beam 41. Thus it can be seen that the height of the H-shaped member 32, which in turn supports the plate 42 that underlies the conveyor 14, may be vertically adjusted by the adjustment of the nuts 67 and 68 relative to the bolts 64 and 65. A cross member 71, which is welded to the top of the hollow beam 41, merely serves as a locator for the upper ends of the bolts 64 and 65 at the time the plates are assembled thereon and the holes through the member 71 are considerably larger in diameter than the diameter of the bolts 64 and 65.

With the foregoing, it can be seen that the conveyor 14 is guided in regard to its horizontal level by the support of the plate 42 therebeneath.

Figure 7:
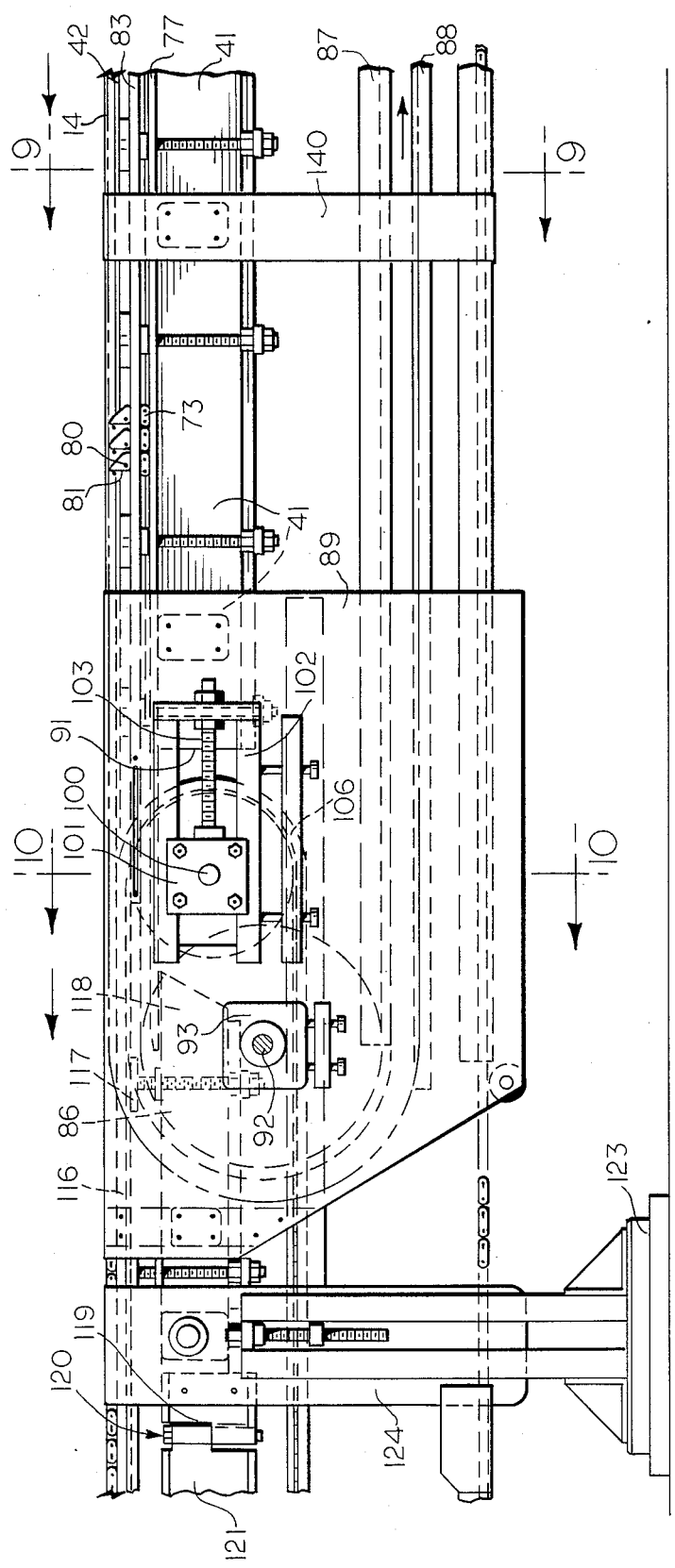
FIG. 7 is a side elevational view of the position of the conveyor that follows FIG. 2.

As previously indicated, the drive chains 55 are guided at opposite sides of the conveyor 14 and extend around an idler sprocket 54 at one end. With reference to FIG. 6, each of the chains 55 are in the form of a series of rollers 72 which are tied together by links 73. Along the outside of the chains 55 the links are regular interconnecting links; however, toward the inside of the chains, each of the connecting links 73 is in the form of an inverted T-shaped member 74, with the cross member of the T serving as the connecting link between adjacent rollers while the upright portion of the member 74 carries a welded upstanding tab member 75 through which a hole 76 is provided. The tab members 75 are welded to tee upper sides of the members 74 in such a fashion that they are in horizontal alignment with each other throughout the full length of the chain 55. The rollers 72 of the chains 55 ride on and are supported by a pair of spaced-apart tracks 77 and 78. Both of the tracks 77 and 78 are provided with a raised flange 79 toward the inside of the respective track. Each of the tab members 75 carry a pivotally mounted driving dog 80. Each of the dogs 80 has a vertical surface 81 which is adapted to contact a roller-like member 63 of the horizontal pins 62 of the conveyor 14. Each of the dogs 80 also has a horizontal surface 82 which is adapted to ride on a horizontal cam track 83. The dogs 80 are mounted to the tab members 75 by means of a horizontal pivot pin 84. As can be seen from FIG. 6, dogs 80 have their supporting pins 84 toward the forward end thereof such that the pivot axis of the pins 84 is well forward of the center of gravity of the dogs, and without the support of the cam track 83 the dogs 80 would pivot in a clockwise direction about the axis of the pivot pin 84. The axial position of the pivot pin 84 is maintained in the dog by a cotter key inserted through an opening in the pin in the area of a vertical cut 85 formed in the upper portion of the horizontal arm area of the dog 80. As best illustrated in FIGS. 2 and 7, the guide tracks 77 and 78 extend from approximately the top of the idler sprocket wheel 54 in a horizontal direction to where a pair of drive sprockets 86 engage the chain 55. The drive sprockets 86, of which there are one on each side of the conveyor, have teeth which engage every other set of rollers and they pull the drive chains 55 from the right to the left, as viewed in FIGS. 2, 7 and 8. After passing around the sprockets 86, the drive chains 55 are guided back to the idler sprockets 54 by horizontal guides 87. The driving dogs 80 are also held with the surfaces 81 vertical by engagement of the horizontal surfaces 82 with a guide bar 88. By maintaining the position of the dogs 80 in its normal biased position, they are more easily picked up and maintained in their correct position at the time they engage the idler 54 about which they will move into the position where they will contact the ends 63 of the conveyor pins 62. Both the guides 87 and 88 are supported from vertical plates 44 and 45 at one end and by a pair of opposed vertical plates 89 and 90 at their other ends.

Figure 8:
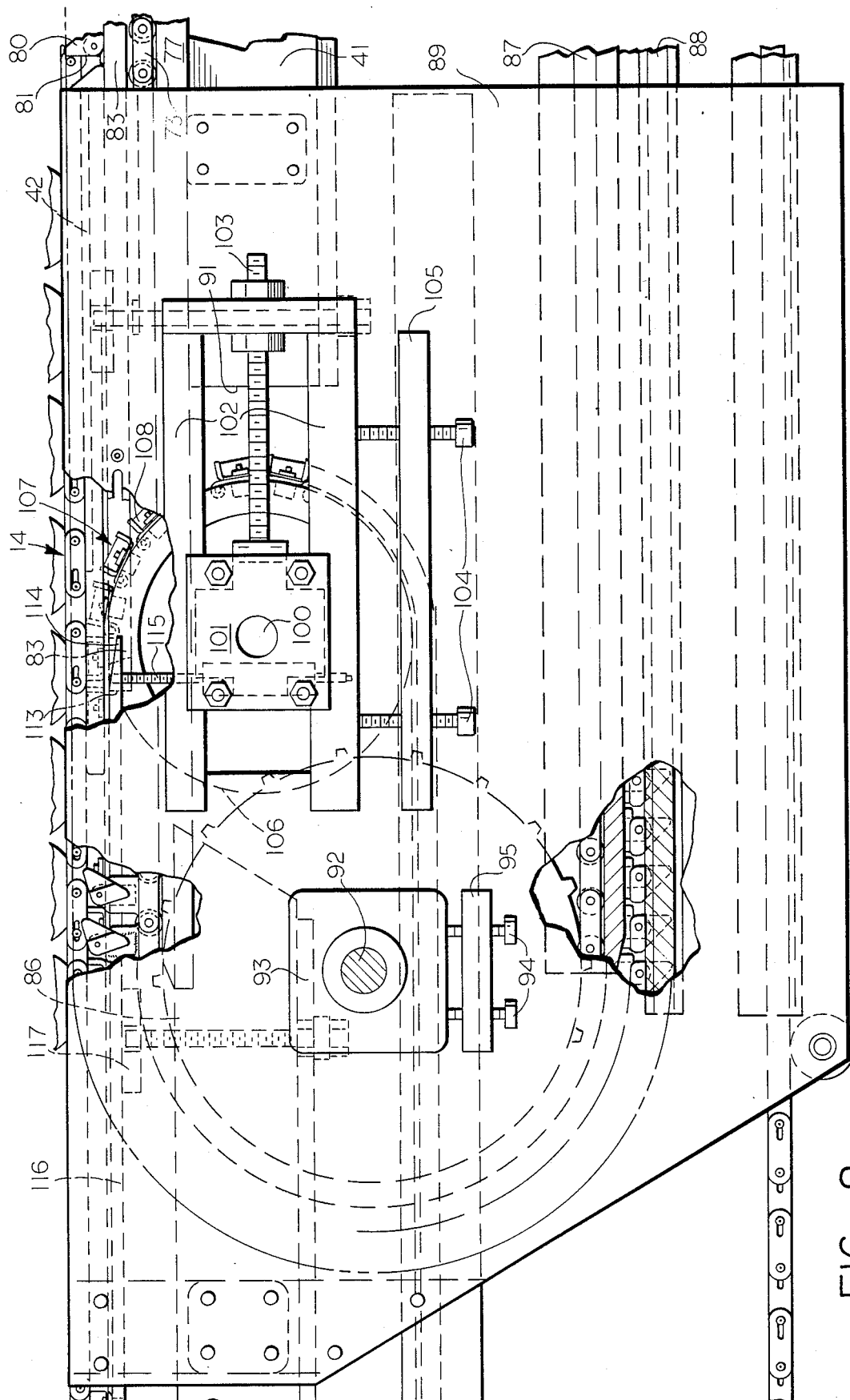
FIG. 8 is an enlarged side elevational view of a portion of FIG. 7 showing the drive system for the conveyor.

As best seen in FIGS. 7 and 8, the beam 41 terminates at point 91 at its leftend. As best seen in FIGS. 7 and 8, the drive sprockets 86 are mounted to a horizontal drive shaft 92. The drive shaft 92 is mounted at both sides in a bearing block 93. The bearing blocks 93 are supported from the outside of the vertical plates 89 and 90 by adjusting screws 94 extending through horizontal plates 95 that are fixed to the outer surface of the plates 89 and 90, it being understood that both ends of the shaft 92 will be supported for vertical adjustment in the manner illustrated specifically in FIG. 8.

Figure 11:
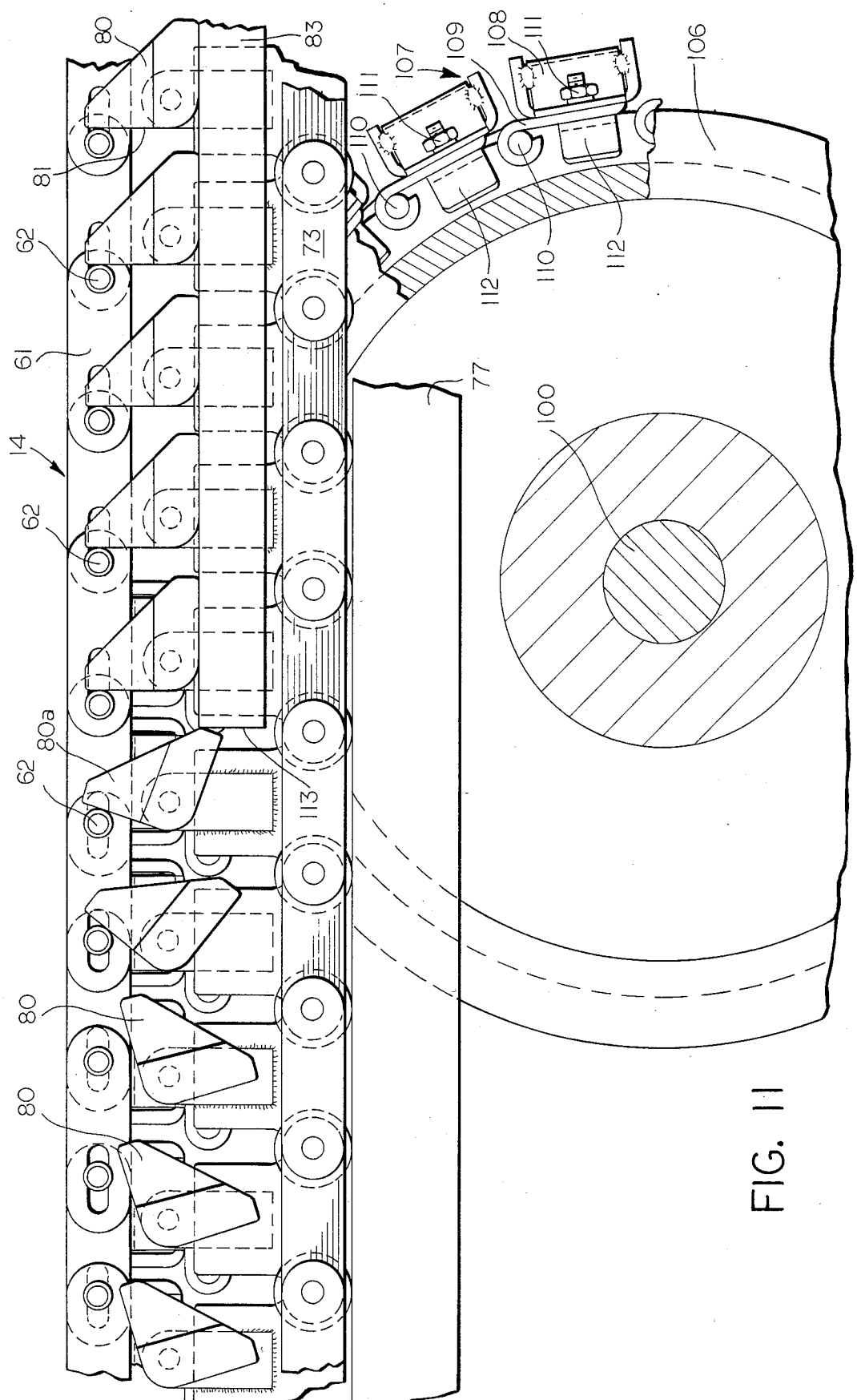
FIG. 11 is a partial cross-sectional view on an enlarged scale taken at 11—11 of FIG. 10.

As schematically illustrated in FIG. 1 and FIG. 11, the shaft 92 carries a drive pulley 96 fixed to the extending end thereof. Pulley 96 has a belt 97 extending therearound which also extends around a pulley 98 mounted to the shaft of a drive motor 99 Thus it can be seen that with the operation of the drive motor 99, the drive sprockets 86 will be driven to pull the chains 55 and in turn the dogs 80 in contact with the ends of the pins of the conveyor 14 to move the conveyor from the position in front of the forming machine in the direction of the annealing lehr 11.

Figure 10:
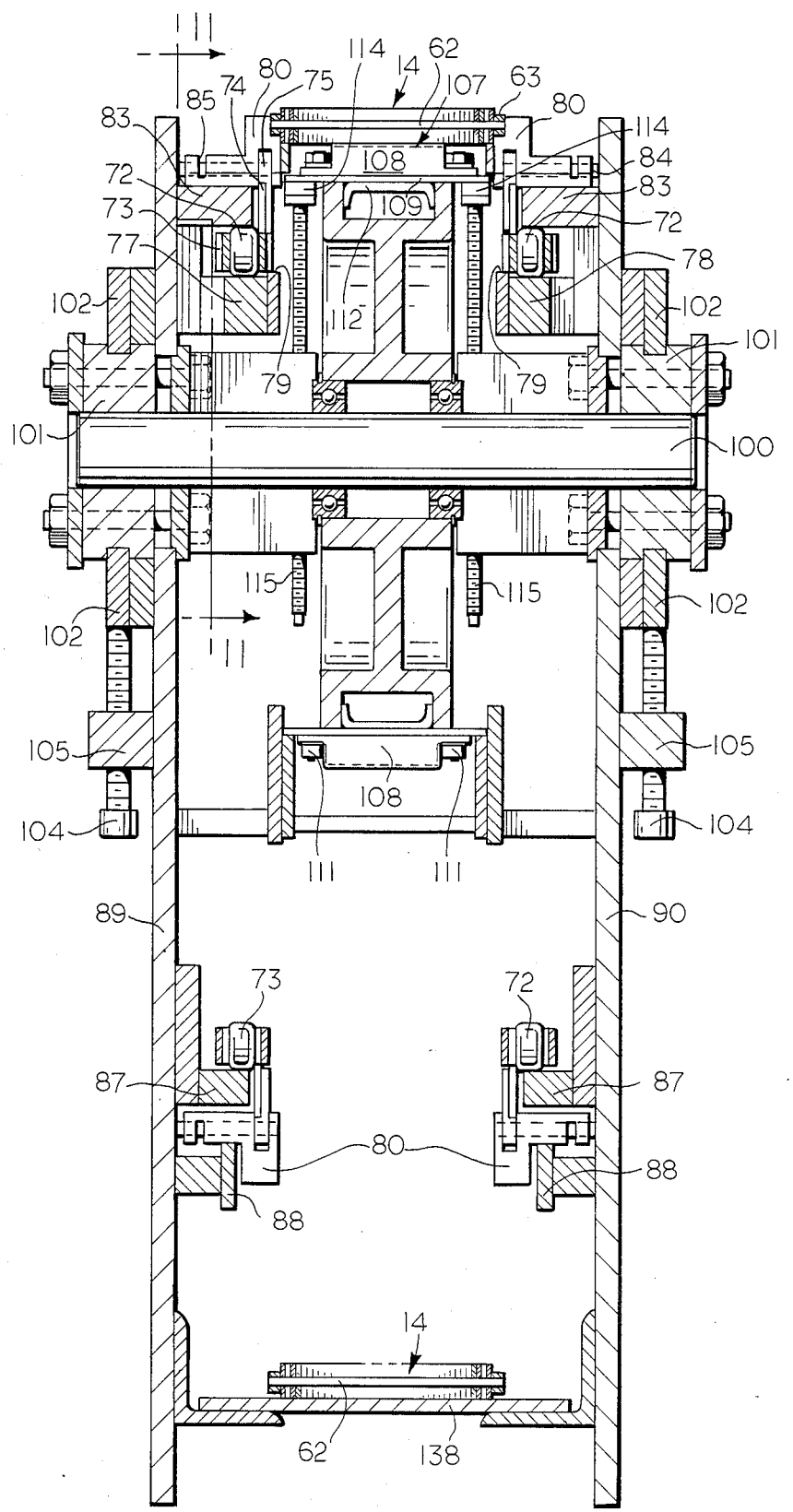
FIG. 10 is a cross-sectional view taken at 10—10 of FIG. 7.

Also extending between the plates 89 and 90 is a horizontal shaft 100 whose ends are supported in bearing blocks 101. The bearing blocks 101 are mounted for horizontal adjustment in guide rails 102 by horizontal screws 103. The bearing blocks 101 are also vertically adjustable by screws 104 which extend through a fixed horizontal bar 105. The shaft 100, as best seen in FIG. 10, supports an idler pulley 106 about which a magnet belt 107 is supported. The magnet belt 107 is made up of a plurality of magnet holders 108 that are bolted to the upper surface of individual links 109, which are joined with the links of adjacent magnet holders by horizontal pins 110. The magnet holders are mounted to the links 109 by threaded bolts and nuts 111.

To the side of the individual links 109 opposite the magnet holders 108 there is welded U-shaped guide plates 112. The U-shaped guide plates 112 extend into and are confined by the external rim of the idler pulley 106. The outer rim of the pulley 106 supports the magnet belt by engagement with the horizontal links 109 which extend beyond the width of the idler pulley 106. As best seen in FIGS. 7, 8, 10 and 11, the idler pulley 106 will support the magnetic belt 107 in the area beneath the conveyor 14 and the height of the pulley is such that the magnets carried in the magnet holder 108 will magnetically attach and essentially become locked to the under side of the conveyor 14.

As previously described, the conveyor 14 has the horizontal pins 62 which extend thereacross and join and hold all of the links 56 by the horizontal slots formed at one end and round holes formed at the other end of the individual links of the conveyor 14. The links 56 of the conveyor and the pins that hold them assembled, as previously described, are driven to the left as viewed in FIGS. 7, 8 and 11, due to the fact that the dogs 80 are held in their position with the surfaces 81 upright by the horizontal cam track 83. However, the cam track 83 is discontinued at 113 and, as shown in FIG. 11, the dog 80, as it leaves the cam track 83, will rotate in a clockwise direction, as shown in FIG. 11, where the dog 80 has begun to rotate in a clockwise direction.

Since the holders 108, which contain magnets, will have locked onto the bottom of the conveyor 14 prior to the dogs 80A leaving or rotating in the clockwise direction, the dogs will continue pulling the conveyor 14 to the left as viewed in FIG. 11 until this point 113. However, the magnet chain or belt is being driven at a linear velocity slightly less than the linear velocity of the drive chains 55. This difference in velocity at the point shown in FIG. 11, where the dog 80A has begun to rotate in a clockwise direction, illustrates how the pin 62 of the conveyor 14 will in effect be moved backward in the slotted ends of the links to assume the position illustrated to the left in FIG. 11 wherein the distances between the pins will be less than the previous distance between adjacent pins 62, thus in effect shortening the length of the conveyor 14 at the point where the drive chain 55 transfer movement of the conveyor 14 to the influence of the magnet belt 107. As can be seen to the left in FIG. 11, all of the dogs 80 have rotated to the point where they are no longer influencing the pins 62 of the chain 14 and at this point the chain 14 has its length locked in at a somewhat lesser spacing than previously. This in effect permits articles such as glassware, which are positioned on the surface of the conveyor 14, to be automatically moved closer together as illustrated in FIG. 8, wherein the bottoms of containers are shown having less spacing between adjacent ones due to the arrangement of the magnetic belt and the release of the conveyor 14 by the driving chains 55 and their dogs 80. As best illustrated in FIG. 8, the magnetic belt 107, as it reaches the point where it becomes attracted to the under side of the conveyor 14, will have its link 109, which is generally in the form of a flat plate 109, supported by the flange of the idler pulley 106. The plate 109, at the point of tangency where the magnetic belt begins to be moved in a linear direction with the conveyor 14, will be supported by a pair of spaced-apart cam tracks 114. The cam tracks 114 are supported at their forward or right hand ends by a pair of threaded bolts 115. The cam tracks 114 converge toward the left and become a pair of spaced apart guide bars 116. These mag-guide bars 116 are supported by cross bars 117. The cross bars 117 are supported in the same manner as the H-shaped blocks 32, as illustrated in greater detail in FIG. 9, it being understood that all of the cross bars 117 are essentially identical and supported essentially in the same manner as the cross blocks 32 shown in FIG. 9.

Figure 13:
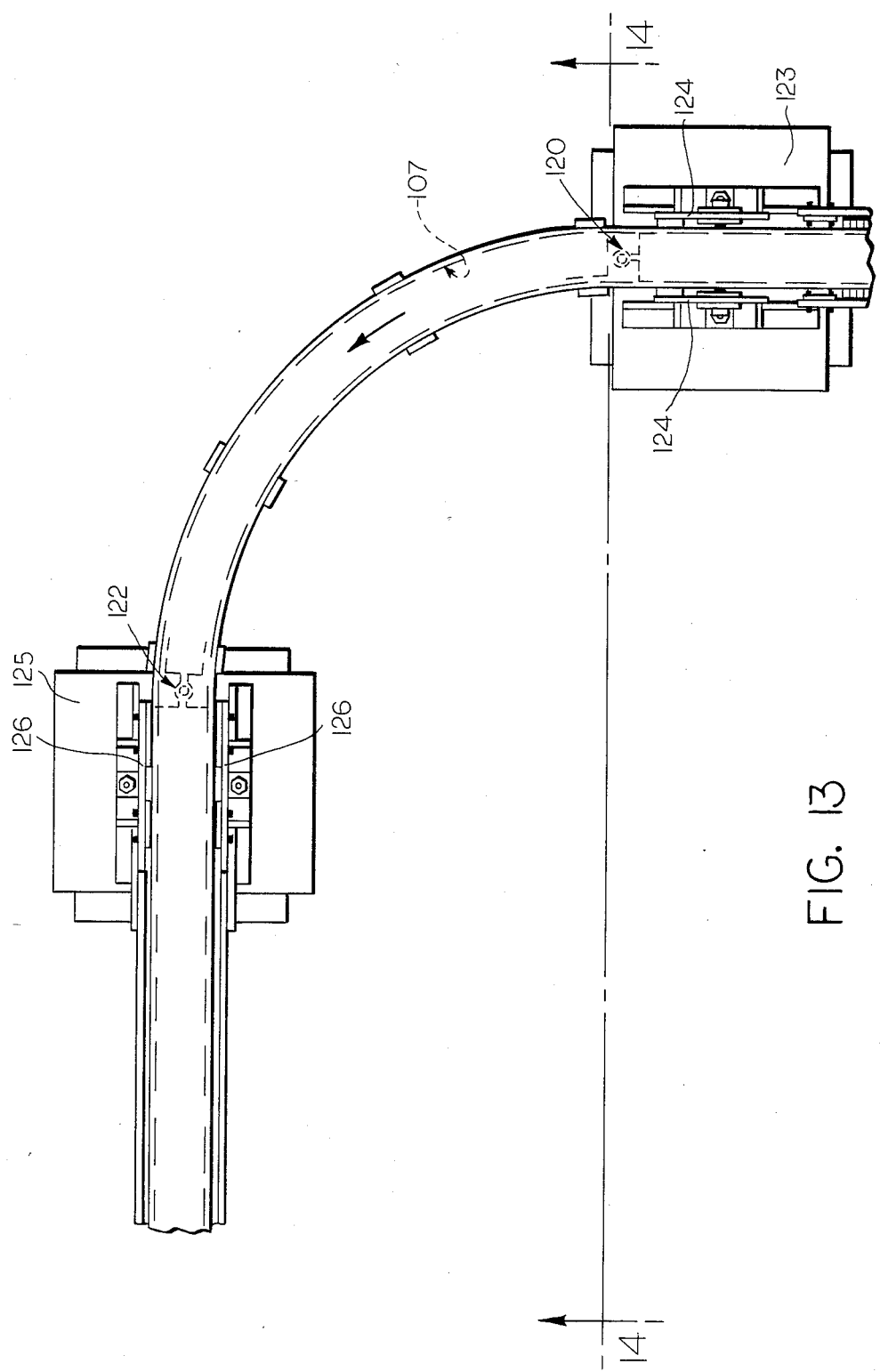
FIG. 13 is a top plan view of a third section of the conveyor that is an extension of FIG. 12.
Figure 14:
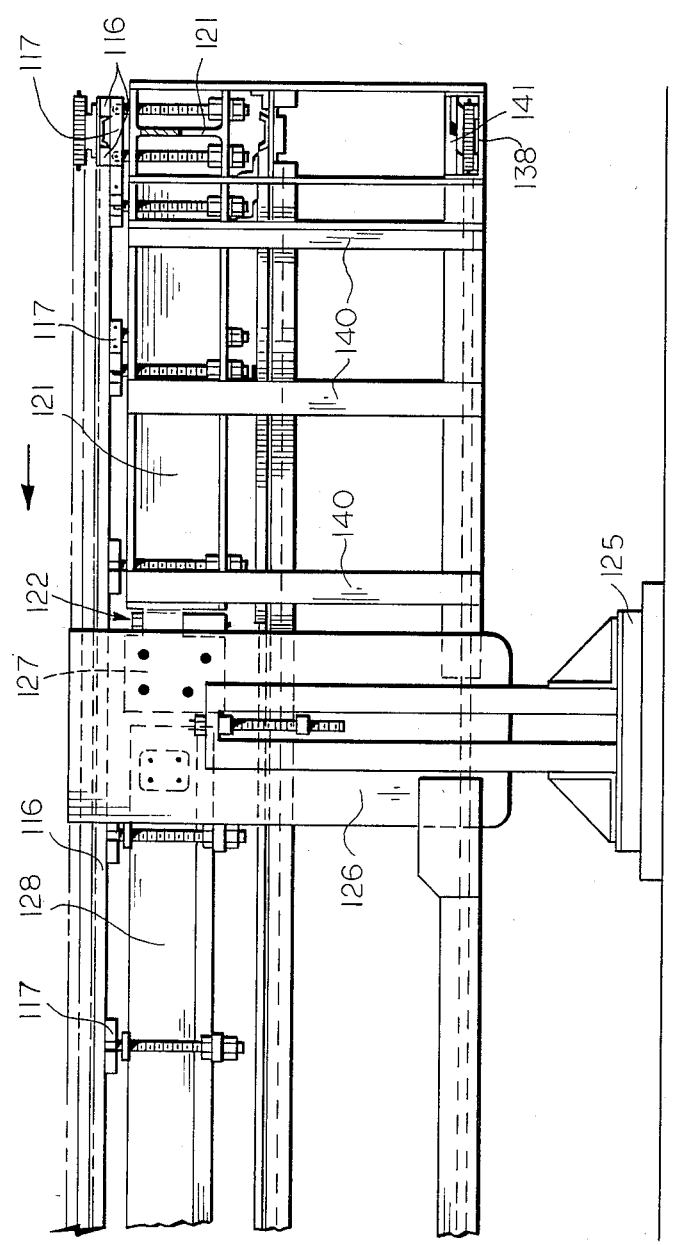
FIG. 14 is a cross-sectional view taken at line 14—14 of FIG. 13.

As previously indicated, in conjunction with FIG. 8, the hollow horizontal beam 41 terminates at 91 before the position of the idler pulley 106 for the magnetic belt. After the position of the magnetic belt, a separate continuation 118 of a structure similar to the hollow beam 41 is provided. At the extreme left end of this support beam 118, the end of the beam has a half of a vertical hinge 120 (see FIG. 13). The other half of the vertical hinge 120 is connected to a curved I-beam 121. The I-beam 121, as best seen in FIG. 14, extends from the hinge 120 in an arc that will describe generally 90° to a second hinge 122. It should be noted that adjacent the hinge 120 the conveyor 14 is supported from a platform or base plate 123. The base plate 123 supports vertical plates 124 which in turn support one end of the support beam 118 in a manner similar to the way the plates 35 were supported by the legs 33 and 34 from the base 20. The end of the curved I-beam 121 is also supported through the hinge 120 by the vertical plates 124 and the base plate 123. The beam 107 also has its opposite end, at the hinge 112, supported by a base plate 125 with vertical plates 126 mounted to the base plate 125. The vertical plates 126 are adjustably mounted to the base plate 225 in the same manner as were the vertical plates 35 and 36 described in connection with FIGS. 2 and 3.

Figure 16:
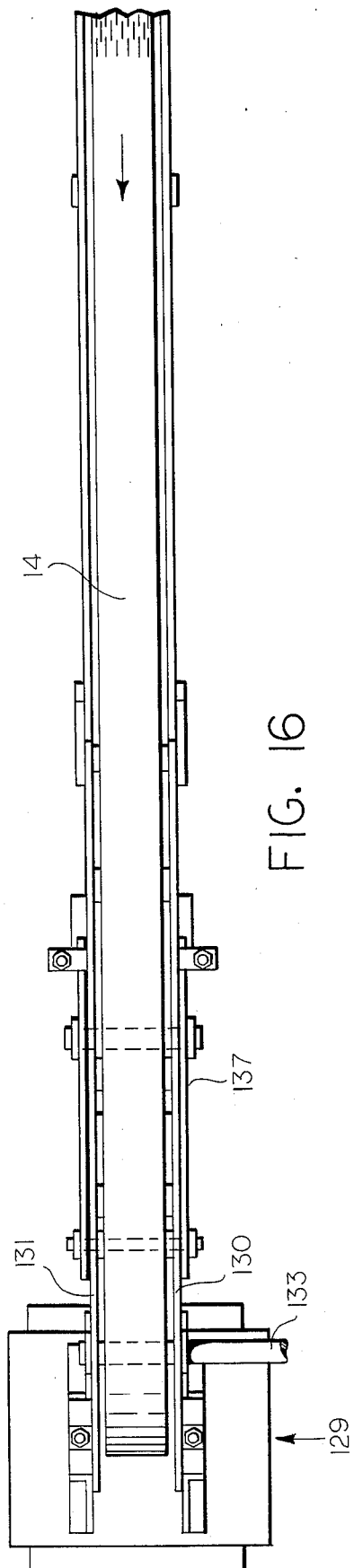
FIG. 16 is a plan view of the segment of FIG. 15.
Figure 15:
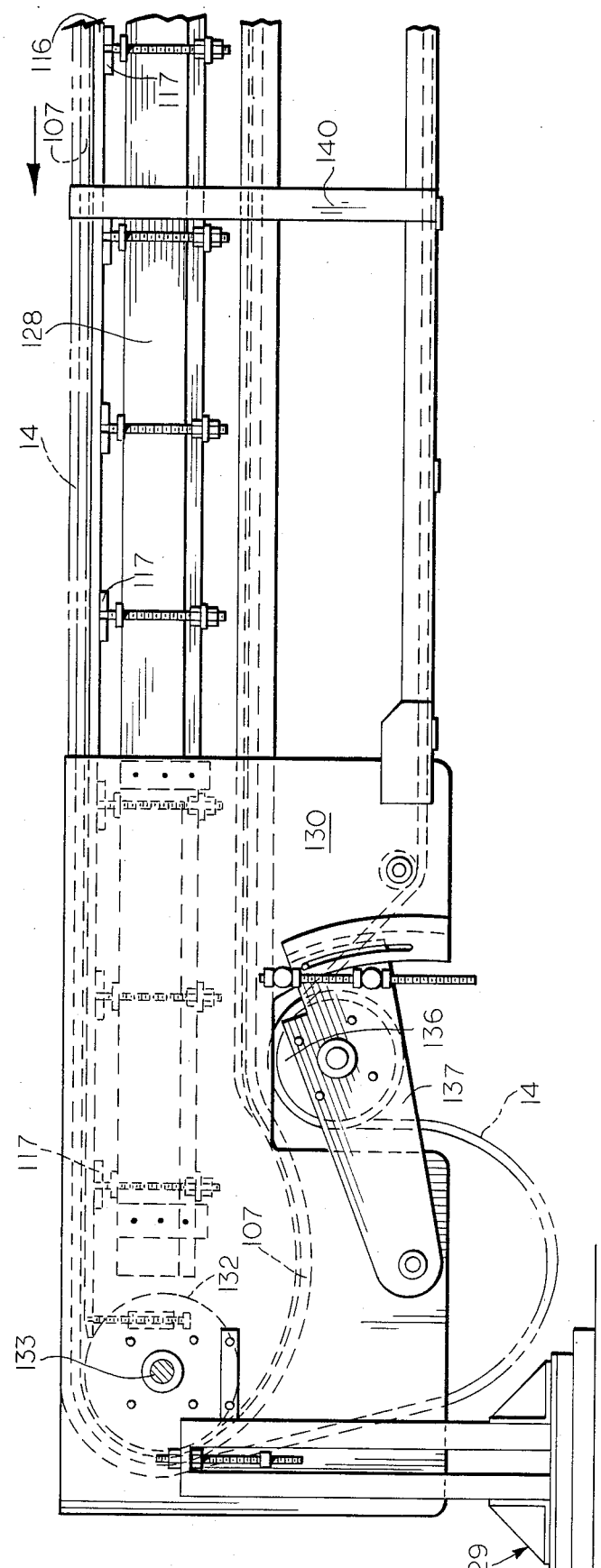
FIG. 15 is a side elevational view of the last segment of the conveyor illustrated.

As best seen in FIG. 14, the hinge 122 has its right hand portion formed at the end of the I-beam 121 and has the left hand or lower portion of the hinge formed with a plate 127 which is anchored to the plate 126. The plate 126, of which there will be a similar plate on the opposite side, supports one end of a hollow beam 128 of essentially the same configuration as the previously described beam 41 shown in FIG. 9. The beam 128 extends from the platform 125 to an end platform 129 as shown in FIGS. 15 and 16. It is understood that the hollow beam 128 supports a plurality of H-shaped support blocks 117 in the manner that the previously described beam 41 supported the H-shaped support blocks 32. The platform 129 supports a pair of spaced-apart vertical plates 13 and 131. The plates 130 and 131 are supported from the platform 129 by previously described vertical legs and an adjusting screw arrangement so as to adjust the height of the plates 130 and 131 relative to the floor. The plates 130 and 131 also support bearings for a drive sprocket 132 which engages the horizontal pins 110 of the magnetic belt 107. The sprocket 132 is driven in a counterclockwise direction as viewed in FIG. 15. The sprocket 132 is mounted to a drive shaft 133. As viewed in FIG. 1, the drive shaft 133 is driven from an electric motor 134 through a variable speed transmission 135

As previously described, the magnet belt 107 is guided through its path of movement through the curve to a position where its straight section, shown specifically in FIGS. 15 and 16, are guided in the linear straight line while at the same time carrying with it the machine conveyor 14.

Figure 9:
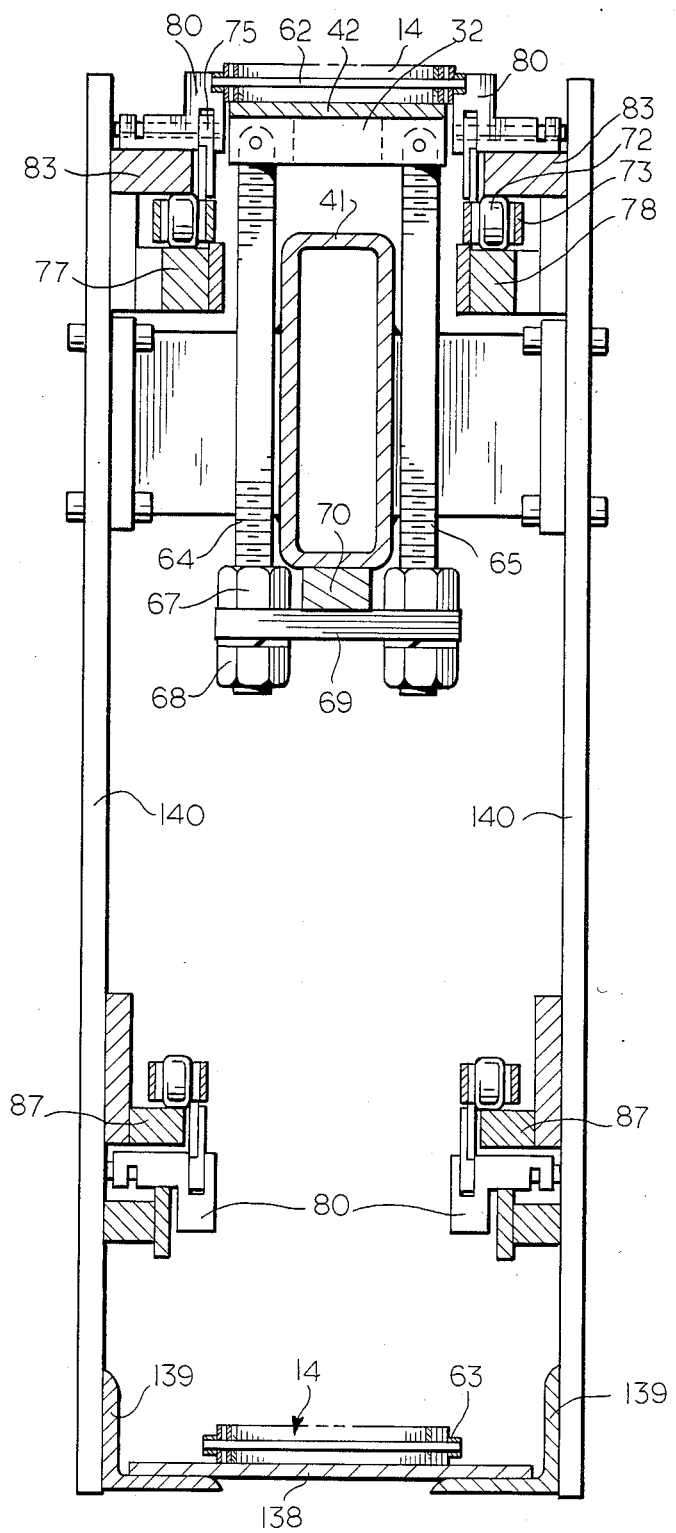
FIG. 9 is a cross-sectional view taken at line 9—9 of FIG. 7.

As would be understood, the machine conveyor 14, as described in conjunction with FIGS. 4 and 5, is a flex-top chain in the sense that it may be moved through angles which are normal to its primary surface and still remain flat. Also it should be understood that the magnetic drive belt, which in effect is locked to the conveyor 14, is the motive force for driving the conveyor after the drive chains have released the conveyor to the magnetic belt. At the left hand end of the path of movement of the conveyor 14, as illustrated in FIG. 15, the magnetic belt 107 will be driven around and generally follow the external contour of the sprocket 132. At approximately the horizontal position opposite the drive shaft 133, the belt 14 will be separated from the magnetic belt 107 and the conveyor 14 will loop down and then have its return path passing over a takeup roll 136. The roll 136 is mounted on a horizontal arm, which is pivoted to the horizontal arm 137, which is pivoted to the plate 130. After passing the takeup roll 136, the conveyor 14 returns to the idler spool 30 as shown in FIG. 2. On this return the conveyor 14 is supported from beneath by a continuous plate 138 as shown in FIG. 9. At various points along the return of the conveyor 14, the conveyor support plate 138 is supported by angle brackets 139, which in turn are anchored to vertical supports 140. During the return of the conveyor 14 around the corner, a pressure plate 141 is utilized to maintain the upper surface of the conveyor 14 in a horizontal attitude and generally in contact with the underlying guide and supporting plate 138. This is to assure a fairly smooth return for the conveyor 14. In addition, when the return reaches the area adjacent the idler pulley 30, a pair of rollers 142 and 143 are used to bring the level of the belt or conveyor 14 into horizontal alignment with the outer circumference of the bottom of the idler spool 30.

The foregoing description has dealt with the system of driving the conveyor 14. It should be apparent that the conveyor 13, shown specifically in FIG. 1, is also driven in substantially the identical manner as that described in detail with respect to the conveyor 14. Here again, in regard to the conveyor 13, it is also to have its length shortened adjacent the position where th magnetic belt takes over from the drive chain 55. The conveyor 14 carries half of the ware produced by the forming machine 10 to a position in front of the lehr 11, at which position it is then pushed onto the lehr mat 16. By the same token, the conveyor 13 carries the other half of the ware produced by the machine 10 to a position beyond the position occupied by the ware on conveyor 14 to a position across the front of the lehr 11 and again the ware is pushed from the conveyor 13 onto the lehr mat 16 of the lehr 11.

With the drive system as described above in detail, it can be seen that the conveyors only need travel as fast as necessary to convey the ware from the machines to the position in front of the lehrs. Furthermore, the actual spacing of the bottles as they are moved onto the conveyors 13 and 14 may assume a certain spacing, but after passing along to the position where the conveyors become controlled by the movement of the magnetic belts, the spacing of the bottles is significantly reduced, and it is contemplated that this reduction would be in the order of 7–15%. In this manner, it is feasible to carry or transport with ease all the ware produced by a ten-section quadruple cavity forming machine.

While the cam track 83 is described as having an end point or position 112 where the dogs 80 will drop from the cam track to release their driving connection with the conveyor, it should be obvious that the actual cam track 83 may be made with its end portion with a relatively movable section to either lengthen or shorten the actual length of the track so that the drop-off point for the dogs may be adjustable. This adjustment may take the form of a lengthwise split of the end section with one-half being mounted on a rack with a crank and pinion for driving the end section that is on the rack.

With the foregoing description, it can be seen that the invention provides a conveyor system for moving bottles from a forming machine to the lehr and varying the spacing of the bottles on a continuous conveyor.

What is claimed:

1. Apparatus for conveying bottles from a glass forming machine to a lehr comprising, an endless, flexible, link-belt conveyor, a first drive means for engaging the ends of horizontal pins in said conveyor to move the conveyor past the line of forming machines to receive and transport the bottles in single file at a first linear velocity while resting thereon, a second drive means for engaging the conveyor and driving the conveyor at a second linear velocity, said second drive means moving the conveyor around a curve and past the loading end of a lehr, second drive means being driven at a lesser speed than first whereby the pins which hold the links in the conveyor are moved into closer relationship after the bottles are positioned thereon to thereby move the bottles closer together as the second drive means moves the conveyor and bottles in front of the lehr, and means for guiding the link-belt conveyor in its return to the position in front of the line of forming machines.

2. The apparatus of claim 1 wherein said second drive means comprises, an elongated endless chain extending beneath the conveyor belt beginning at the engagement point and extending beyond the front of the lehr, a series of magnets carried by said elongated chain and adapted to lock onto the underneath of the conveyor, and means for driving said endless chain.

3. The apparatus of claim 1 wherein said first drive means comprises, a pair of endless chains running in spaced apart parallel relationship, a plurality of pivotally mounted dogs on said chains adapted to engage outwardly extending pins on said conveyor, cam means for holding said dogs in engagement with said pins for a finite length of travel in said conveyor and for permitting said dogs to pivot out of contact with said pins after said conveyor reached a specific position in its travel.

4. The apparatus of claim 3 wherein said specific position in the conveyor travel is just prior to where the said second drive means engages said conveyor at which time the cam ceases to hold the dogs in contact with the pins.

5. The apparatus of claim 1 wherein said means for guiding the link-belt conveyor includes a first roller mounted for rotation about a horizontal axis, said first roller being located at the end of the conveyor travel just prior to passage in front of the forming machines.

6. Apparatus for moving newly formed glass containers from a plural section forming machine to a lehr comprising, at least one endless metal, flexible, chain link conveyor, means for guiding a horizontal run of said conveyor in front of the plural sections of the forming machine, said conveyor being formed of laterally extending cross pins extending through openings in a plurality of parallel links, said links having the form of an elongated generally flat plate having a round hole through one end and a horizontally extending oblong hole in the other end, said links being positioned with their width dimension vertical, and in side-by-side parallel relationship with said pins extending through the openings, each link also being formed with oppositely extending lateral off-set portions above and below the oblong opening to provide spacing between abutting links, said pins having laterally extending end portions, a pair of endless chains extending along the sides of said conveyor in underlying relationship to the ends of said pins, a plurality of dogs carried by said endless chains to engage said extending end portions of said pins for pulling the link-belt conveyor past the forming machine sections to a specific position, a second endless chain drive system, said second system adapted to engage the conveyor at a position just prior to said specific position, means driving said second drive system at a linear velocity which is slower than the linear velocity of the first drive system whereby the individual pins of said conveyor are pushed ahead as the second drive system engages said conveyor, said second drive system pulling the conveyor belt around a corner and past the front of the lehr, said second drive system disengaging said conveyor belt after passing the lehr and means for guiding the conveyor belt back to the position in front of the forming machines.

7. The apparatus of claim 6 further including a second endless, flexible, metal chain link conveyor, means for guiding said second conveyor past the forming machine sections to a lehr, second conveyor having a drive system that is substantially the same as said first conveyor, whereby newly formed ware is transported from the forming machine sections at one spacing and across the front of the lehr at a closer spacing.

8. The apparatus of claim 1 wherein said second drive means comprises, an elongated endless chain extending beneath the conveyor belt beginning at the engagement point and extending beyond the second area, a series of magnets carried by said elongated chain and adapted to lock onto the underneath of the conveyor, and means for driving said endless chain.

* * * * *